Sept. 18, 1945.  M. M. MARISIC  2,384,944
MANUFACTURE OF CATALYST
Filed June 19, 1943  2 Sheets-Sheet 1
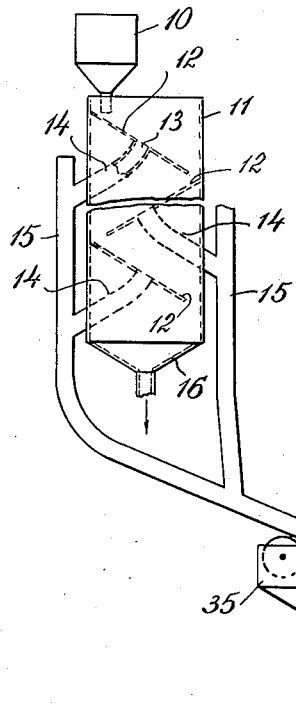
Fig.1,
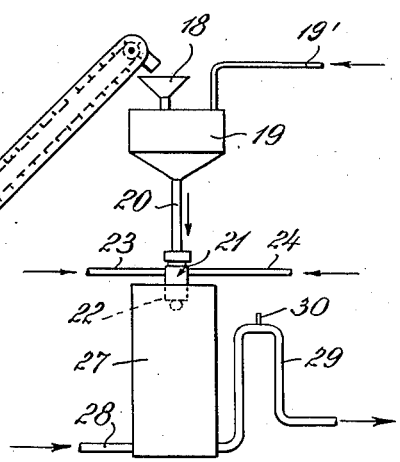
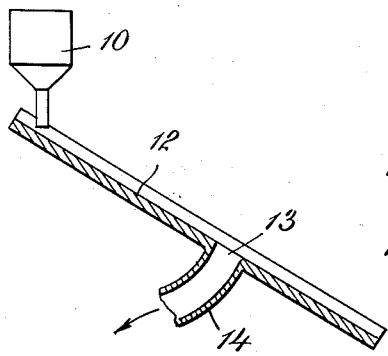
Fig.3,
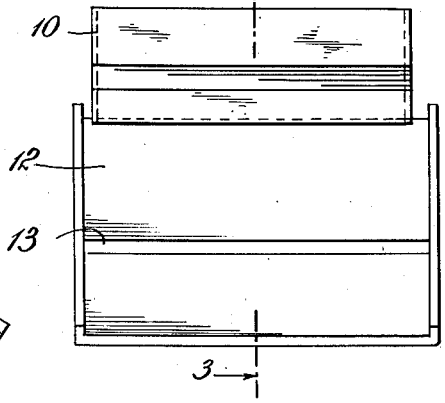
Fig.2,
INVENTOR.
MILTON M. MARISIC
BY
Oswald G. Hayes
ATTORNEY.

Sept. 18, 1945. M. M. MARISIC 2,384,944
MANUFACTURE OF CATALYST
Filed June 19, 1943 2 Sheets-Sheet 2
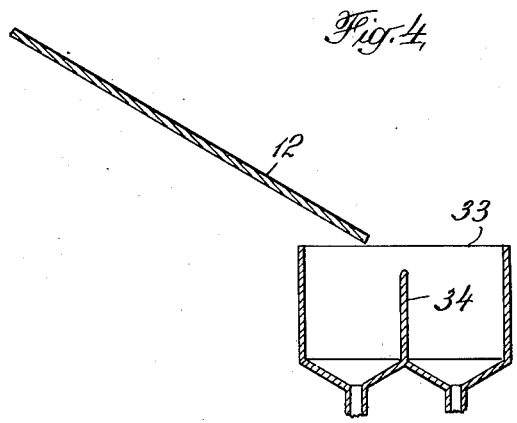
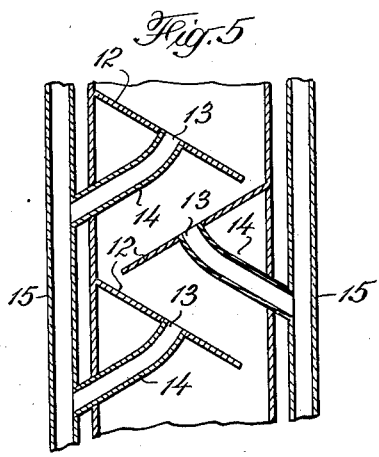
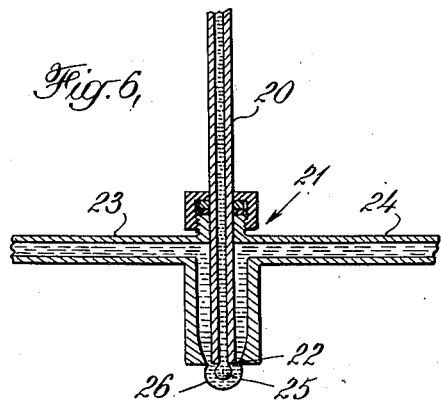
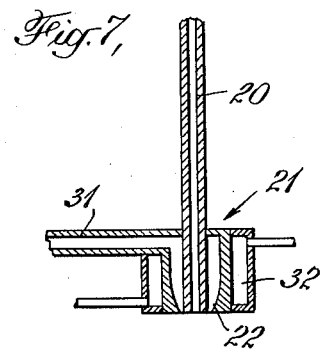
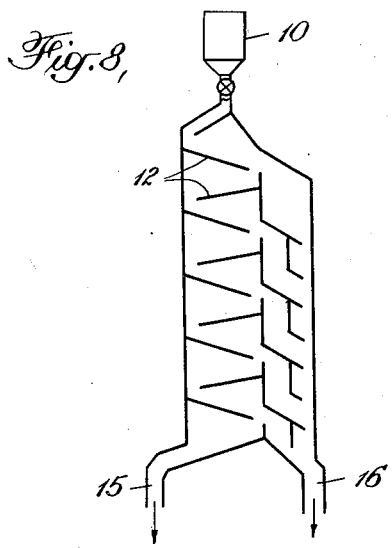
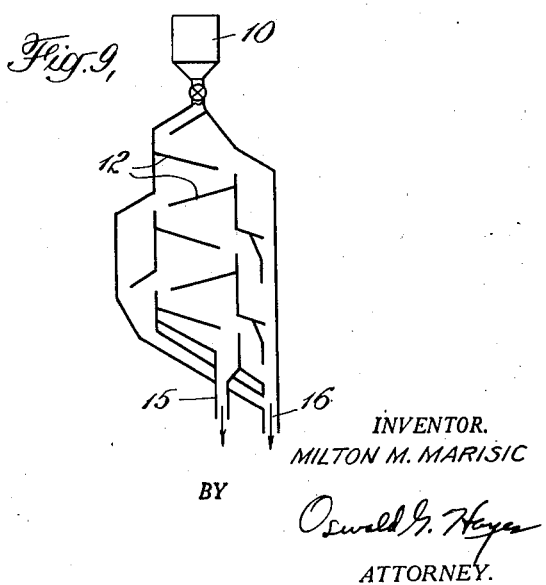
INVENTOR.
MILTON M. MARISIC
BY
ATTORNEY.

Patented Sept. 18, 1945

2,384,944

UNITED STATES PATENT OFFICE 2,384,944

MANUFACTURE OF CATALYST

Milton M. Marisic, Woodbury, N. J., assignor to Socony-Vacuum Oil Company, Incorporated, a corporation of New York Application June 19, 1943, Serial No. 491,544

3 Claims. (Cl. 252—250)

This invention relates to the preparation of adsorptive and catalytic masses, and is particularly concerned with a novel bead-form catalyst prepared from the waste product of the process described in my prior copending application Serial No. 461,454, filed October 9, 1942.

In my said prior application there is described a process for making a bead-form catalyst by extruding a gelable solution into a body of a liquid immiscible with the gelable solution. The solution, which is of the type generally known as a sol, is formed at such concentration, temperature and pH that gelation will occur during the time globules of sol fall through the oil into which the sol is extruded. The globules assume a spheroidal shape and gel in that form, thus producing firm elastic globules of hydrogel. After washing to remove water soluble salts, the gel globules are dried, causing them to shrink and become hard while retaining the spheroidal shape assumed during formation.

Under commercial conditions of manufacture, breakage and fracture of the spheroidal beads occurs at various stages in the operation and the defective beads are preferably removed from the product. The disadvantages of the cracked beads are that the sharp corners tend to scratch surfaces of the equipment in which they are used, especially in a process employing a moving catalyst bed. These scratches result in the catalyst taking up iron from the walls of equipment, thus decreasing catalyst activity. In any type of apparatus, a primary advantage of spherical catalyst is uniformity of gas flow therethrough while broken catalyst tends to reduce this uniformity.

I have now developed a process for the separation of defective beads, which may thereafter be crushed and utilized—either in processes employing powdered gels or incorporated in spheroidal catalyst forms. According to a preferred embodiment of my invention, cracked beads are so handled that they break along fractured surfaces and thus are removed with broken beads, eliminating the possibility of breakage when the catalyst is placed in use.

Further objects and advantages of my invention will be made clear in the discussion below of preferred embodiments of the invention illustrated in the annexed drawings wherein:

Figure 1 shows diagrammatically a plant for separating, crushing and reforming defective beads;

Figure 2 is a plan view of a unit separator, according to my invention;

Figure 3 is a vertical section on line 3—3 of Figure 2;

Figure 4 is a sectional view of another type of unit separator;

Figure 5 is a partial section of a multi-stage separator similar to that indicated generally in Figure 1;

Figure 6 is a sectional view of apparatus for incorporating crushed gel in spherical beads;

Figure 7 is a sectional view of another type of apparatus for accomplishing the same purpose; and Figures 8 and 9 are diagrammatic illustrations of two additional forms of separators.

Referring particularly to Figure 1, dried bead catalyst is supplied to a hopper 10 from which it falls into a vertical separator 11, having a plurality of inclined surfaces 12 (see Fig. 5). Each of the surfaces 12 is provided with a slot 13 transversely of the surface. As beads pass down the surface 12, perfect beads will roll freely and will clear the slot 13 by reason of their forward momentum. Broken beads, having some surfaces which are flat or otherwise not smooth curves, will partly roll and partly slide down the surface 12 until they reach the slot 13. Because of their slow speed, broken beads will fall through the slot 13 to be carried by shutes 14 to collectors 15 disposed along the sides of the device. As the beads cascade from one inclined surface 12 to another, they are caused to drop sharply with considerable impact upon the next lower surface 12, thus breaking the beads along any cracks already existing. Because of the high hardness and the very substantial elasticity of perfect beads, these do not suffer to any appreciable extent from impact. It is, therefore, apparent that those beads which are perfect when supplied to hopper 10 will pass through the separator to the conical bottom 16, from which they can be withdrawn for immediate use or packaged for shipment or storage.

Cracked and broken beads separated in the tower 11 are conveyed by collectors 15 to a crushing and pulverizing mill 35 of conventional design. Upon being reduced to powder in the mill 35, the pulverized material is conveyed by elevator 17 to the hopper 18 of a mixing device 19. In 19, the powder is mixed with water, or other suitable fluid, admitted by pipe 20 and milled to form a slurry of about the consistency of a cake batter. If desired, additional solids may be incorporated in the slurry to give body thereto, for example, clays or undried gels and precipitates of suitable chemical composition. The slurry is forced by a pump (not shown) through a pipe 20 to a forming device 21. If desired, the crushed beads may furnish the powder-form catalyst for processes employing catalyst suspended in gaseous reactants without further treatment.

The apparatus designated as 21 may be in the form shown in Figure 6 or Figure 7, the essential difference between the two being that a gelable solution is formed within the device of Figure 6, while the device of Figure 7 operates on solution prepared at another point and conveyed to the forming device.

With particular reference to Figure 6, the pipe 20 terminates in an open end surrounded by an annular nozzle 22 adapted to supply a gelable solution. The sol extruded through the annular nozzle 22 is formed in the device by turbulent mixing of two reactive solutions supplied by pipes 23 and 24 in predetermined proportions. The rate of supply of the slurry through pipe 20 and the sol through nozzle 22 is so adjusted that there is formed a droplet 25 of slurry surrounded by a substantial layer 26 of a sol having a short gelation time. When this compound globule has reached a size dependent upon the characteristics of the nozzle and nature of a water-immiscible liquid into which the nozzle projects, the compound globule will break away forming a globule of sol having a core of slurry. The compound globule falls through a column of water-immiscible fluid, such as mineral oil, in column 27 and the outer shell of sol sets to a firm elastic gel in the oil before passing into a layer of water below the oil in column 27. Water is admitted by pipe 28 and withdrawn through gooseneck 29, having a vent 30, the compound globules being carried out with the water stream for washing and drying.

The forming device of Figure 6 is adapted to operate with a sol which has a short gelation time, for example, 10 to 20 seconds. The forming device of Figure 7 is designed to utilize low temperature sols having relatively long gelation times at the temperature of formation. Since gelling time decreases considerably with temperature, it is possible to modify the temperature of the sol enough to reduce the gelation time to such an extent that oil columns of practical height may be used. For example, a sol having a gelation time of a half-hour, more or less, is admitted by pipe 31 surrounded by a water jacket 32 adapted to maintain the sol at low temperature, for example, 40° to 50° F. The compound globule formed at the annular nozzle 22, passes into an oil bath of elevated temperature, say, 200° F., thus reducing gelation time to a matter of seconds, permitting the use of an oil column of 8 or 10 feet.

Because of the thick body of the slurry supplied, there is only a minor tendency for the sol and slurry to mingle before the gelation occurs. Some mingling is advantageous in that it prevents the formation of a definite boundary between the two types of materials in the compound globule.

The invention is also applicable to the formation of hollow gel globules by the inclusion of a water-immiscible fluid such as a droplet of oil or the like in a shell of inorganic hydrogel. Upon drying, the oil can be evaporated and any traces of carbonaceous matter can be burned out by oxidation. Similarly, the invention can also be used to form compound globules having cores of such materials as clays and the like.

The methods described above yield globose beads which individually consist of an envelope of gel surrounding a core of powdered gel or other finely-divided material. If desired, the powdered gel or other material may be uniformly distributed throughout the spheroidal bead by simply mixing the powder with one of the reactant solutions to form a slurry prior to mixing in the nozzle. Thus, it is obvious that the methods of this invention may be used for preparing contact masses for catalytic, adsorptive or other purposes by incorporating in an inorganic gelable colloid the desired material.

The usual procedures employed in depositing catalysts on supports of various kinds consist of:

I. Soaking the catalyst support in a solution of the catalytic material and then drying the impregnated support.

II. Precipitating the catalytic material in the presence of the powdered support and pelleting the resulting mass.

III. Mixing the granular or pelleted catalyst support with a paste of the catalyst and drying.

The objection to I and III are that the catalyst is not uniformly distributed on the support and that, in most cases, it is held loosely on the latter; hence, it is gradually carried away as fines with the vapors or fluids flowing through the contact mass.

Procedure II above has the usual objections associated with pelleting operations.

This invention eliminates the objections to the customary methods of supporting catalysts. It has the advantage of spheroidal particles and the use of inorganic gels which are extremely rugged and which may have some beneficial catalytic properties.

Referring now to Figures 2 and 3, the structure of the inclined surface 12, slot 13 and chute 14 is substantially similar to that of the individual surfaces of Figures 1 and 5. As shown, an elongated hopper 10 is used to distribute the beads across the top of the inclined surface.

Figure 4 differs from the other type of apparatus shown only in the specific nature of the dividing mechanism used to separate slow-moving from fast-moving particles. The inclined surface 12 has its lower end disposed above a double hopper 33. A partition 34 which separates the two sections of the hopper also serves to divide the stream of beads into perfect, rapidly-moving beads which fall into the right-hand section, and imperfect, slow-moving beads which drop into the left-hand section.

Figures 8 and 9 show diagrammatically two additional forms of classifiers for separating broken and whole beads. These separators are better adapted for handling large quantities than is the separator shown in Figure 1, because they are designed to remove whole beads from the bulk, the whole beads constituting by far the greater quantity of the original mass. Thus, the separator of Figure 1 is designed to drop out a portion of the broken beads at each stage. This requires that the distribution of beads be such that each individual bead is permitted to roll free in order to have full momentum as it passes the separating point. In the devices of Figures 8 and 9 large quantities of beads may be handled since the apparatus will operate efficiently with removal of only a portion of the whole beads at any one point. By the time the lower part of one of these devices is reached, 50–80% or more of the particles charged through hopper 10 have been removed as sound beads; and any whole beads remaining are thus enabled to roll freely as individuals and attain accurate separation at the last stage.

*Example I*

In a typical use of the forming device in Figure 6, a bead catalyst of about 10% alumina and 90% silica is separated in the column 11 and imperfect beads are then ground to pass through a 100-mesh screen. This powder is then milled with about 10 to 20% of its weight of a wet gel corresponding to that from which the bead catalyst was originally formed. Sufficient water is added to make a highly viscous slurry and this is supplied to pipe 20 under pressure. A solution of sodium silicate containing 105 grams of $SiO_2$ per liter is prepared by diluting water glass containing 28.7% $SiO_2$ and 8.9% $Na_2O$. A second solution is prepared containing 34.10 grams of $Al_2(SO_4)_3$ and 25.5 grams of $H_2SO_4$ per liter. These two solutions are admitted by pipes 23 and 24, respectively, in the ratio of one volume of the former to 0.78 volume of the latter. The compound globules of solution fall through an 8-foot column of gas oil and the shells gel before entry into a layer of water at the bottom of the column. The compound globules are washed with aluminum sulfate solution to replace zeolitic sodium by aluminum and water-soluble salts are then washed out with water. The washed globules are dried slowly at 180° F. until shrinkage is complete and then heat-treated in the conventional manner for preparation of synthetic catalysts. Very good conversions to gasoline can be obtained by passing a gas oil charge in contact with this catalyst at about 850° F.

*Example II*

The use of a forming device as illustrated in Figure 7 is dependent upon the relationship between temperature and gelation time for inorganic sols. The period between formation and gelation of a sol may be regarded as an aging period, in which the velocity of aging varies with temperatures. Thus, a batch of sol can be made up at room temperature having a gelation time of one hour and used over a period of 15 to 45 minutes by subjecting the sol used to a heating of decreasing time and/or temperature to give uniform gelation time at the point of use. Even more satisfactory is continuous formation of sol, heat treatment and extrusion into an oil bath of higher temperature than the heat treatment. In a typical example of this, a water glass solution is prepared by diluting 27.40 pounds of "N" brand of sodium silicate with 17.68 pounds of water. This solution contains 212 grams of $SiO_2$ and 66 grams of $Na_2O$ per liter. A second solution prepared by dissolving 387 grams of sodium aluminate in water to form ten liters of solution is thoroughly mixed with the water glass in the ratio of 100 volumes of water glass to 67.8 volumes of sodium aluminate solution. The solution described is then mixed with 3.780 normal hydrochloric acid in the ratio of 100 volumes of the former to 32.6 volumes of the latter under conditions of efficient agitation. The resultant sol, having a pH of 3.4 and a gelation time of two hours at room temperature, is pumped through a preheater coil immersed in a bath at 70° C. The sol remains in the preheater for 120 seconds and is then passed immediately by pipe 31 to the forming device 21 having its orifices in the top of a column of oil twelve feet deep maintained at a temperature of 95° C. The compound globules are firm upon reaching the bottom of the oil column and, upon washing and drying, are active cracking catalyst.

I claim:

1. A process for preparing smooth surfaced catalyst particles having a shell of hard dry gel surrounding a core; which process comprises preparing a viscous slurry of solid material desired for said core, extruding the slurry to form drops thereof, extruding about the drops of slurry a hydrosol of inorganic oxide characterized by an inherent capacity to set to a hydrogel upon the lapse of a suitable period of time without addition to or subtraction from said sol of any substance, to thereby form compound globules each having a shell of said sol and a core of said slurry, admitting said globules to a body of a liquid medium substantially immiscible with water in which said globules assume spheroidal shape due to surface tension between said sol and said liquid medium, retaining said compound globules in said medium until gelation occurs, effecting retention in said hydrosol of substantially all the constituents of said sol until gelation occurs, washing the compound globules after gelation and drying the washed globules.

2. A process for preparing smooth surfaced catalyst particles having a shell of hard dry gel surrounding a core; which process comprises preparing a viscous slurry of ground dried gel, extruding the slurry to form drops thereof, extruding about the drops of slurry a hydrosol of inorganic oxide characterized by an inherent capacity to set to a hydrogel upon the lapse of a suitable period of time without addition to or subtraction from said sol of any substance, to thereby form compound globules each having a shell of said sol and a core of said slurry, admitting said globules to a body of a liquid medium substantially immiscible with water in which said globules assume spheroidal shape due to surface tension between said sol and said liquid medium, retaining said compound globules in said medium until gelation occurs, effecting retention in said hydrosol of substantially all the constituents of said sol until gelation occurs, washing the compound globules after gelation and drying the washed globules.

3. A process for preparing smooth surfaced catalyst particles having a shell of hard dry gel surrounding a core differing in nature from said shell; which process comprises preparing a viscous slurry of material desired for said core, extruding the slurry to form drops thereof, extruding about the drops of slurry a hydrosol of inorganic oxide characterized by an inherent capacity to set to a hydrogel upon the lapse of a suitable period of time without addition to or subtraction from said sol of any substance, to thereby form compound globules each having a shell of said sol and a core of said slurry, admitting said globules to a body of a liquid medium substantially immiscible with water in which said globules assume spheroidal shape due to surface tension between said sol and said liquid medium, retaining said compound globules in said medium until gelation occurs, effecting retention in said hydrosol of substantially all the constituents of said sol until gelation occurs, washing the compound globules after gelation and drying the washed globules.

MILTON M. MARISIC.